US012640386B2

(12) United States Patent
Hall et al.

(10) Patent No.: US 12,640,386 B2
(45) Date of Patent: May 26, 2026

(54) ALL AQUEOUS THERMALLY-REGENERATIVE BATTERY

(71) Applicant: The Penn State Research Foundation, University Park, PA (US)

(72) Inventors: Derek Hall, University Park, PA (US); Serguei Lvov, University Park, PA (US); Bruce E. Logan, University Park, PA (US); Christopher Gorski, University Park, PA (US)

(73) Assignee: The Penn State Research Foundation, State College, PA (US)

( * ) Notice: Subject to any disclaimer, the term of this patent is extended or adjusted under 35 U.S.C. 154(b) by 650 days.

(21) Appl. No.: 18/041,032

(22) PCT Filed: Aug. 13, 2021

(86) PCT No.: PCT/US2021/045940
§ 371 (c)(1),
(2) Date: Feb. 9, 2023

(87) PCT Pub. No.: WO2022/036218
PCT Pub. Date: Feb. 17, 2022

(65) Prior Publication Data
US 2023/0268540 A1 Aug. 24, 2023

Related U.S. Application Data

(60) Provisional application No. 63/065,553, filed on Aug. 14, 2020.

(51) Int. Cl.
*H01M 8/18* (2006.01)

(52) U.S. Cl.
CPC .......... *H01M 8/182* (2013.01); *H01M 8/188* (2013.01)

(58) Field of Classification Search
None
See application file for complete search history.

(56) References Cited

U.S. PATENT DOCUMENTS

| | | | |
|---|---|---|---|
| 5,470,669 A | 11/1995 | Ludwig et al. |
| 2017/0033383 A1 | 2/2017 | Lloyd et al. |
| 2020/0106118 A1 | 4/2020 | Wang et al. |

OTHER PUBLICATIONS

Gong et al., "All-Soluble All-Iron Aqueous Redox-Flow Battery," ACS Energy Letters (1), May 2016, 89-93.*

(Continued)

*Primary Examiner* — Jonathan Crepeau
(74) *Attorney, Agent, or Firm* — Weston R. Gould; Dinsmore & Shohl LLP

(57) ABSTRACT

Provided are systems and methods for thermally-regenerative batteries that avoid solid metal dissolution and deposition reactions. A thermoelectrochemical system includes a reactor comprising first and second electrode compartments with a separator interposed between the first and second electrode compartments. The reactor further includes first and second electrodes disposed in the first and second electrode compartments, respectively. The first and second electrode compartments include first and second aqueous electrolyte solutions, respectively. The first electrode compartment, the second electrode compartment, or both include a thermally regenerative ligand and optionally a non-thermally regenerative ligand. The first and second aqueous electrolyte solutions exclude solid metal dissolution and deposition reactants. Also provided are methods of using the thermoelectrochemical systems provided herein.

29 Claims, 5 Drawing Sheets

(56)     References Cited

OTHER PUBLICATIONS

Palakkal, V. M. et al., High power thermally regenerative ammonia-copper redox flow battery enabled by a zero gap cell design, low-resistant membranes, and electrode coatings, ACS Applied Energy Materials, 3(5): 4787-4798, Apr. 20, 2020.

Springer, R. et al., An all-aqueous thermally regenerative ammonia battery chemistry using Cu(I, II) redox reactions, Journal of the Electrochemical Society : JES, 168(7): 070523(internal pp. 1-6), Jul. 13, 2021.

Zhang, F. et al., A thermally regenerative ammonia-based battery for efficient harvesting of low-grade thermal energy as electrical power, Energy & Environmental Science, 8(1): 343-349, 2014.

* cited by examiner $CO > CN^- > NO_2^- > en > NH_3 \approx py > NCS^- > H_2O > ox > OH^- > F^- > Cl^- > SCN^- > Br^- > I^-$

ALL AQUEOUS
THERMALLY-REGENERATIVE BATTERY

CROSS REFERENCE TO RELATED APPLICATIONS

This application is a U.S. National Stage of PCT/US2021/045940 filed Aug. 13, 2021 and which depends from and claims priority to U.S. Provisional Application No: 63/065,553 filed Aug. 14, 2020, the entire contents of each of which are incorporated herein by reference.

TECHNICAL FIELD

The present specification generally relates to systems and methods for energy storage and, more specifically, systems and methods for thermally-regenerative batteries that avoid solid metal dissolution and deposition reactions.

BACKGROUND

Large scale energy storage is an increasingly important component of the electrical grid. With the ever increasing use of renewable energy systems such as wind and solar the need to store and manage the energy produced by these technologies increases as well. Moreover, rapid price swings in the power market based on seasonal energy demand can be moderated by the use of large energy storage systems that can assist in addressing these needs and can help in improving revenue.

Among the important emerging technologies to address these needs, flow batteries offer many advantages including the ability to store large amounts of energy in an ever increasingly economical way. Flow batteries are rechargeable electrochemical energy storage devices that capitalize on oxidation and reduction of two soluble electroactive species for storing and releasing energy. Active species are stored in separate tanks and transferred through a cell stack for the generation of electrochemical energy.

While important advances have been made in improving the storage and output capacities of flow battery systems, there remains a need for systems that are thermally regenerative so as to be capable of coupling with low-grade thermal energy produced from industrial processes, manufacturing processes or geothermal fluids so as to further improve the economic benefits of the use of flow batteries and increase the presence of on demand power when needed. There is also a need for increasing the maximum power density of these systems to further reduce system costs.

SUMMARY

The following summary is provided to facilitate and understanding of some of the innovative features unique to the present disclosure and is not intended to be a full description. A full appreciation of the various aspects of the disclosure can be gained by taking the entire specification, claims, drawings, and abstract as a whole.

A thermoelectrochemical system is provided. The thermoelectrochemical system includes a reactor comprising first and second electrode compartments with a separator interposed between the first and second electrode compartments. The reactor further includes first and second electrodes disposed in the first and second electrode compartments, respectively. The first and second electrode compartments include first and second aqueous electrolyte solutions, respectively. The first electrode compartment, the second electrode compartment, or both include a thermally regenerative ligand and optionally a non-thermally regenerative ligand. The first and second aqueous electrolyte solutions exclude solid metal dissolution and deposition reactants.

Also provided is a method of using a thermoelectrochemical system. The method includes providing a thermoelectrochemical system comprising a first electrode compartment and a second electrode compartment. A separator is interposed between the first electrode compartment and the second electrode compartment. The system further includes first and second electrodes disposed in the first and second electrode compartments, respectively. The first and second electrode compartments include first and second aqueous electrolyte solutions, respectively. The first electrode compartment, the second electrode compartment, or both include a thermally regenerative ligand and optionally a non-thermally regenerative ligand. The first and second aqueous electrolyte solutions exclude solid metal dissolution and deposition reactants. The method further includes adding ammonia to the first aqueous electrolyte solution, thereby promoting a first half reaction in the first aqueous electrolyte solution and a second half reaction in the second aqueous electrolyte solution:

$$\text{first half reaction: } M(\text{NH}_3)_j^{x+}(aq) + z\text{NH}_3 \rightarrow M(\text{NH}_3)_{j+z}^{x+y}(aq) + ye^-$$

where x is 1 or 2; y is 1 or 2; $0 \leq j \leq 5$; and $0 \leq z \leq 5$, $$\text{second half reaction: } M(L)_j^{x+y}(aq) + ye^- + zL \rightarrow M(L)_{j+z}^x(aq)$$

where $-4 \leq x \leq 1$; y is 1 or 2; $0 \leq j \leq 5$; and $0 \leq z \leq 5$.

The first half reaction results in a spent electrolyte solution and the second half reaction results in a first aqueous electrolyte solution, the reactions producing an electrical current.

These and additional features provided by the present disclosure will be more fully understood in view of the following detailed description in conjunction with the drawings, abstract, and claims provided.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings, where like structure is indicated with like reference numerals and in which:

DETAILED DESCRIPTION

Figures 1, 2A:
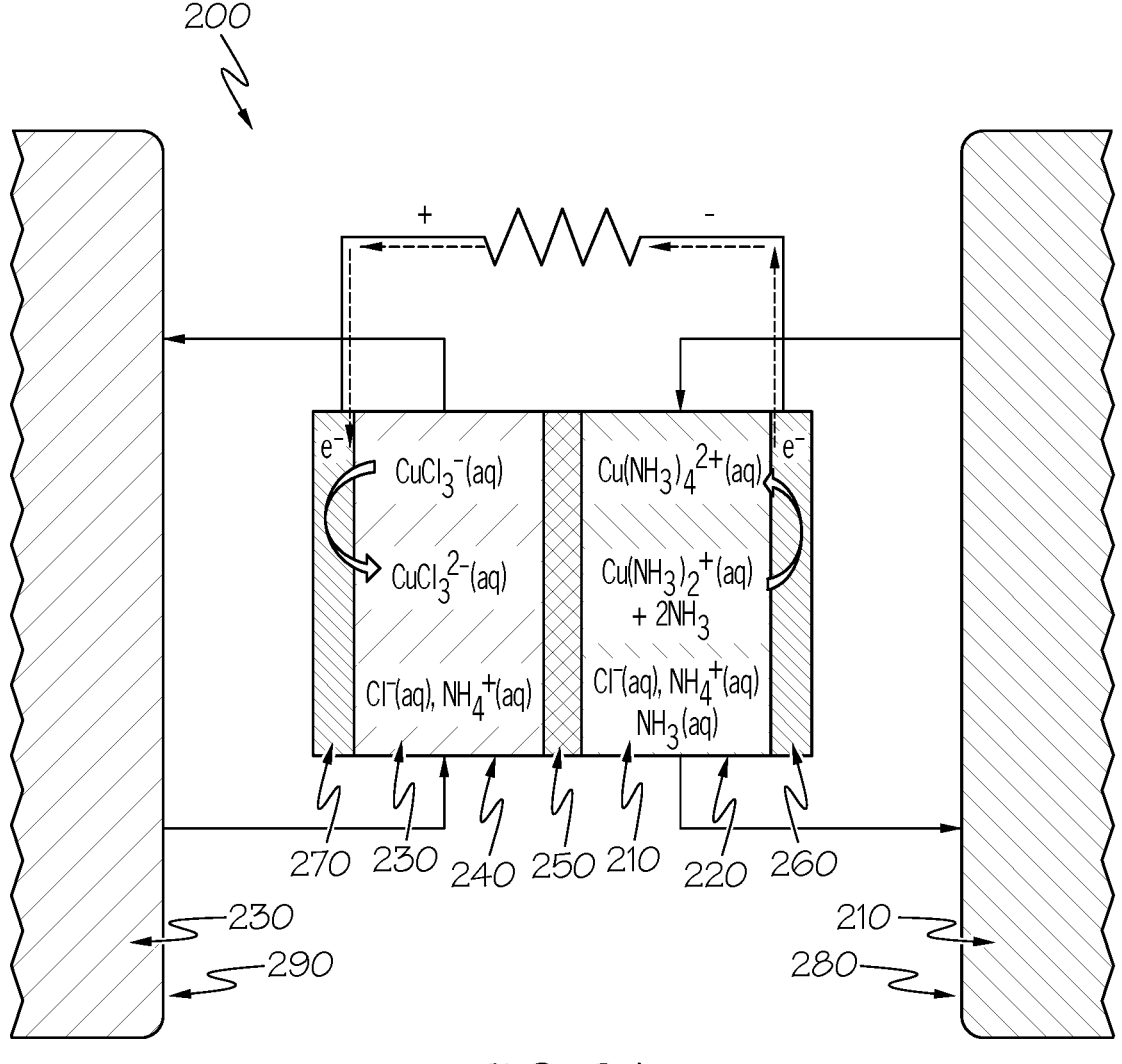
FIG. 1 shows a spectrochemical series listed according to ligand field strength, where 'en' is ethylenediamine, 'py' is pyridine and 'ox' is an oxalate anion.
FIG. 2A depicts an exemplary all aqueous thermally-regenerative battery according to some aspects as provided herein.

Provided are electrochemical flow batteries that not only greatly improve energy density over prior systems, but are also thermally regenerative and address prior issues of undesirable dendrite formation during cycling. As such, provided are systems and electrochemical flow batteries that employ an all aqueous electroactive species that do not generate solid metal dissolution and deposition reactants.

Dendrite formation can limit the performance of battery systems relying on metal deposition reactions, resulting in decreased cycle life. Additionally, the use of electroactive solid phases couples a device's power capacity to its energy storage capacity, which is undesirable. By precluding dendrite formation as is achieved using the provided systems and methods, an all aqueous system provides higher cycle lives. Additionally, in some aspects the systems feature power capacity decoupled from energy capacity. Thermo-electrochemical systems according to the present disclosure avoid solid metal dissolution and deposition reactions by leveraging differences in electrochemical potential between aqueous soluble metal complexes with different oxidation states. Some aspects as provided herein are an energy storage device that can convert excess low-grade thermal energy (e.g. T<150° C., optionally T<130° C., optionally T<110° C., optionally T<100° C., or optionally T<90° C.) or electrical energy optionally produced on-site into electrochemical energy that can be later converted into electrical energy on demand with greatly improved efficiency.

The present disclosure builds on the technology as described in U.S. Pat. No. 10,431,842. Key distinguishing features include increased power density and energy storage density, and the use of fully soluble complexes in both electrolytes such that solid metal dissolution and deposition reactants do not form and are excluded from the systems.

As used herein, the term "thermally regenerative" with respect to batteries is defined as being able to recharge the battery in full or in part using low-grade thermal energy (T<150° C.).

As used herein, the term "all aqueous" is defined as excluding one or more solid metal dissolution and deposition reactants. In some aspects no solids form, transiently or otherwise, during charge and discharge cycles in an all aqueous battery.

As used herein the term "solid metal dissolution and deposition reactant" is defined as a metal or metal ion that, when present in an aqueous electrolyte solution, converts from one oxidation state to another during charge and discharge cycles where the metal or metal ion is not fully soluble in the aqueous electrolyte solution in at least one of the oxidation states. As such, in an all aqueous battery, all metals and metal ions remain in solution during charge and discharge cycles. Exemplary solid metal dissolution and deposition reactants include copper metal, silver metal, and silver ions.

Ligands can influence the equilibrium potentials between metal redox couples by altering the relative stabilities of their oxidation states. These effects are governed by the charge, stereochemistry, and soft/hard characteristics of the ligand. Standard electrode potentials, E°, can either increase or decrease due to the connection between ligand bonding and the Gibbs energy of formation of electroactive species. Electrochemical studies of Ru(II, III) and Fe(II, III), complexing with organic ligands, linked variations in ligand stereochemistry and spin states to E°.

The stereochemical preference of a given metal ion depends on its spin state, which subsequently results in an increase/decrease of the energy required to overcome energy barriers. The spin state of a metal ion determines its reactivity towards ligand substitution. For example, the $d^{10}$ Cu(I) ion is spherically symmetric and its common geometries range from 2 to 4 coordinate bonds, while the $d^9$ Cu(II) ion is usually found in a tetragonal coordination environment, although complexes with other geometries are known. Based on the hard/soft principle, Cu(I) preferentially bonds with soft donors, while Cu(II) favors more borderline donors.

Shown in FIG. 1 is and exemplary spectrochemical series, which is a list of ligands based on the strength of their metal interactions as determined by the d orbital splitting energy. Ligands that force electron pairing are known as strong field ligands, creating low spin octahedral complexes with first row metal ions, whereas weak field ligands such as $F^-$ and $OH^-$ will normally give low spin complexes only with second and third row metals.

In an exemplary embodiment, the strong preference of weak field ligands, like chloride and bromide ions, to complex with copper(I) ions relative to copper(II) ions increases the electrode potential of the copper(I, II) redox reaction from 0.15 V vs. the standard hydrogen electrode (SHE) to between 0.3 and 0.7 V vs. SHE. Conversely, the presence of stronger field strength ligands, like ammonia, substitutes chloride ligands in the copper (I, II) metal complexes and shifts the electrode potential of the copper(I, II) redox reaction from 0.15 V vs. SHE down to between 0 and −0.2 V vs. SHE.

$$\text{Positive Electrode: } CuCl_3^- + e^- = CuCl_3^{2-} \quad E^0 = +0.73 \text{ V}$$

$$\text{Negative Electrode: } Cu(NH_3)_5^{2+} + e^- = Cu(NH_3)_2^+ + 3NH_3 \quad E^0 = -0.25 \text{ V}$$

Electrochemical potential differences between aqueous soluble metal complexes can be exploited by incorporation into an all aqueous battery, thereby precluding the performance limitations of batteries relying on solid metal dissolution and deposition reactions. Additionally, it has been found that thermochemical systems utilizing all aqueous electroactive species according to the present disclosure provide much higher maximum power densities compared with analogous systems that rely on metal deposition reactions.

In addition, if one of the ligands has a suitably low boiling point, such a battery may be charged thermally. The ligand may be volatilized from one electrode compartment after discharge, captured, and reintroduced to the other electrode compartment to charge the battery.

In general, a thermoelectrochemical system according to the present disclosure for the first time utilizes the above to provide a thermally regenerative system with dramatically increased power density relative to prior thermoelectrochemical systems. A thermoelectrochemical system as provided herein includes a reactor comprising first and second electrode compartments. A separator may be interposed between the first and second electrode compartments. The reactor may further include first and second electrodes disposed in the first and second electrode compartments, respectively. The first and second electrode compartments may include first and second aqueous electrolyte solutions, respectively. The first electrode compartment, the second electrode compartment, or both may include a thermally regenerative ligand and optionally a non-thermally regenerative ligand. The first and second aqueous electrolyte solutions may exclude solid metal dissolution and deposition reactants.

Optionally, a channel is included defining a passage from the exterior of the reactor to the interior. More than one channel may be included to allow and/or regulate flow of materials into and out of the reactor. For example, one or more channels may be included to allow for inflow and/or outflow of a thermally regenerative ligand.

In an exemplary continuous flow configuration, a channel may be included to allow flow of a substance into a reaction chamber and a separate channel may be used to allow outflow of a substance from the reaction chamber. More than one channel may be included for use in any inflow or outflow function.

A regulator device, such as a valve, may be included to further regulate flow of materials into and out of the reaction chamber. Further, a cap or seal is optionally used to close a channel. For example, where a fuel cell is operated remotely or as a single use device such that no additional materials are added, a cap or seal is optionally used to close a channel.

A pump may be provided for enhancing flow of material into and/or out of a reaction chamber.

Optionally, dissolved oxygen is removed from the first and/or second electrode compartments to minimize deleterious oxidation reactions. Thus, in one option, oxygen is removed and/or excluded from a thermoelectrochemical system according to embodiments. For example, the reactor is sealed to prevent oxygen leakage into the reactor and/or the first and/or second aqueous electrolyte solution can be sparged with nitrogen or other non-oxygen containing gas to remove oxygen.

Reaction conditions in the reactor may be those that promote the desired reactions. In general, reaction conditions include a temperature in the range of 0° C. –100° C., such as in the range of 20° C. –85° C., or in the range of 23° C. –75° C.

A separator may be included that separates the first electrode compartment from the second electrode compartment, thereby inhibiting the mixing of metal species between the first and second aqueous electrolyte solutions. Like most electrochemical systems, some chemical crossover is expected across the membrane, but the rate of crossover will vary with the choice of membrane materials. Though membrane crossover will impact the energy storage capacity, membrane crossover will not limit the life cycle of the battery because the chemical constituents of both sides are essentially the same with the exception of the thermally regenerative ligand, and therefore any undesired concentration imbalances can be undone by mixing the two solutions together and removing the thermally regenerative ligand.

The separator may be an ion exchange membrane. The ion exchange membrane may be a cation or anion exchange membrane.

Anion exchange membranes may include, for example, quaternary ammonium-functionalized poly(phenylsulfone), and quaternary ammonium-functionalized divinylbenzene cross-linked poly(styrene). Further examples include AMI ion exchange membranes made by Membranes International, Inc. New Jersey, USA. Tokuyama Corporation, Japan, also produces a range of anion exchange membranes such as AHA and A201 that can be included in a system according to embodiments as provided herein. Fumatech, Germany, anion exchange membranes, FAA, can be included in a system according to embodiments as provided herein.

Cation exchange membranes may include a sulfonic acid based polymer. In some embodiments, the cation exchange membrane may include a perfluorosulfonic acid (PFSA) based polymer such as a tetrafluoroethylene-perfluoro-3,6-dioxa-4-methyl-7-octenesulfonic acid copolymer (Nafion®) . Commercially available tetrafluoroethylene-perfluoro-3,6-dioxa-4-methyl-7-octenesulfonic acid copolymer (Nafion®) membranes are described by their equivalent weights and thicknesses. Equivalent weight (EW) is the number of grams of dry Nafion per mole of sulfonic acid groups when the material is in the acid form. In some aspects, the cation exchange membrane may be a tetrafluoroethylene-perfluoro-3,6-dioxa-4-methyl-7-octenesulfonic acid copolymer having 1100 EW. According to one or more aspects, the cation exchange membrane is a tetrafluoroethylene-perfluoro-3,6-dioxa-4-methyl-7-octenesulfonic acid copolymer having 1100 EW and a thickness selected from 7 mil (Nafion® 117), 5 mil (Nafion® 115), and 0.8 mil (Nafion® HP).

Electrodes in the thermoelectrochemical systems according to the present disclosure are electrically conductive. Exemplary electrode materials may be, but are not limited to carbon materials, optionally carbon paper, carbon cloth, carbon felt, carbon wool, carbon foam, carbon black, carbon mesh, activated carbon, graphite, porous graphite, graphite powder, graphite granules, graphite fiber. An electrode may be or include a conductive polymer, illustratively polyacetylene, polythiophene, polypyrrole, polyphenylene, polyaniline, or a combination thereof. Optionally, an electrode is or includes a conductive metal, optionally platinum, ruthenium, iridium, titanium, or a combination thereof. Optionally, an electrode may be or include any combination of any of the foregoing. In some aspects, a carbon material is a carbon based material meaning that the material is predominantly carbon.

Electrodes of various sizes and shapes are contemplated in the thermoelectrochemical systems according to the present disclosure. For example, an electrode may be any regular or irregular polygon, circular, oval, or other desired shape. Electrode size may be tailored to the shape of the first or second electrode compartments and may lie on or form a wall thereof. Optionally, an electrode is sized to be the same as a wall of an electrode compartment. Optionally, one or more of the electrodes are sized to be smaller than a wall of a compartment and may be integral or not integral with the wall of an electrode compartment.

Electrodes may be positioned in various ways to achieve a desired spacing or positioning between the electrodes. For example, a first electrode may be chemically or electrically connected to a second electrode whereas chemical connection may be by a separator and electrical connection may be by a conductive material, optionally through a load.

One or more supports, gaskets, spacers and/or seals may be optionally included to inhibit movement of fluids or gases between adjacent electrode compartments of systems of the present invention.

Embodiments of systems as provided herein may be configured such that substances, such as the thermally regenerative ligand, may be introduced to a first electrolyte solution, a second electrolytes solution, a first electrolyte reservoir, a second electrolyte reservoir, or any combination thereof, optionally in batches or as a continual flow. In some aspects, the thermally regenerative ligand may be continuously flowed in to one of the electrode compartments.

According to some aspects, the thermally regenerative ligand may be added as a liquid or a gas. Optionally, a thermally regenerated ligand is added as a gas. Optionally, a thermally regenerative ligand may be added as a liquid.

The first and second electrode compartments include first and second aqueous electrolyte solutions, respectively. The first electrode compartment, the second electrode compartment, or both include one or more thermally regenerative ligands and optionally one or more non-thermally regenerative ligands. The first and second aqueous electrolyte solutions exclude solid metal dissolution and deposition reactants.

In some aspects, the thermally regenerative ligand optionally has a boiling point less than 100° C., optionally less than 50° C., optionally less than 20° C., optionally less than 0° C., optionally less than −20° C. The thermally regenerative ligand may be present at a concentration greater than 1 mol/kg, greater than 2 mol/kg, or greater than 4 mol/kg. In some aspects, the thermally regenerative ligand is only present in one electrode compartment. The thermally regenerative ligand is soluble in water. According to some embodiments, the thermally regenerative ligand comprises ammonia.

The non-thermally regenerative ligand may have a boiling point greater than 100° C. or greater than 200° C. The non-thermally regenerative ligand may be present at a concentration greater than 1 mol/kg, greater than 2 mol/kg, or greater than 4 mol/kg. Optionally, the non-thermally regenerative ligand is present in both electrode compartments. Optionally, the non-thermally regenerative ligand comprises an ammonium salt. The ammonium salt may optionally be selected from ammonium chloride and ammonium bromide. Optionally, a non-thermally regenerative ligand is a halide anion, optionally chloride or bromide.

The non-thermally regenerative ligand is optionally included in a first electrolyte, a second electrolyte or both at a concentration of 0.1-10 mol/kg. Optionally, a concentration of a non-thermally regenerative ligand is 0.5-7 mol/kg, optionally 0.5-5 mol/kg, optionally 3-5 mol/kg.

The first and second aqueous electrolyte solutions optionally include a metal M. A thermally or non-thermally regenerative ligand optionally complexes with the metal M to make a metal complex. Optionally, the first and second aqueous electrolyte solutions both include metal complexes with the same metal M. The metal M may optionally be selected from copper, zinc, iron, cobalt, and nickel. Optionally, the metal M is copper. Optionally, one, two, three or more metal M is present in a first electrolyte solution, a second electrolyte solution, or both.

Optionally, a first electrolyte serves as a positive electrode reactant and includes a metal complex including M associated with a non-thermally regenerative ligand, optionally chloride or bromide. Optionally, a second electrolyte serves as a negative electrode reactant includes a metal complex M, an optional non-thermally regenerative ligand, and a thermally regenerative ligand. In the case where the thermally regenerative ligand is ammonia, the ammonia displaces the non-thermally regenerative ligand in the second electrolyte to make a complex with the M. In some aspects, following operation of the flow battery and substantially establishing equilibrium between the first and second electrolytes, the generated ammonia in the second electrolyte may be isolated using heat to remove the ammonia thereby allowing the non-thermally regenerative ligand to complex with the M thereby forming a solution that is used as a positive electrolyte in a subsequent operation of the flow cell. The ammonia removed from the second electrolyte solution may be added back to the exhausted first electrolyte solution thereby generating an electrolyte suitable for use as a negative electrode reactant in a subsequent operation of the flow battery. In this way, the entire flow battery is thermally regenerative using only low heat for isolation of the volatile thermally regenerative ligand and allow substantially continuous operation of the system.

In some embodiments, the first and second aqueous electrolyte solutions exclude solid metals, solid metal salts, and solid metal oxides. Optionally, the first and second aqueous electrolyte solutions both comprise copper and a non-thermally regenerative ligand, optionally chloride, bromide, or other non-thermally regenerative ligand.

The resulting thermoelectrochemical systems optionally have a power density in excess of 60 W/m$^2$. A power density is optionally equal to or greater than 70 W/m$^2$, optionally 80 W/m$^2$, optionally 90 W/m$^2$, optionally 100 W/m$^2$, optionally 150 W/m$^2$, optionally 200 W/m$^2$, optionally 250 W/m$^2$, optionally 300 W/m$^2$, optionally 350 W/m$^2$, optionally 400 W/m$^2$, optionally 450 W/m$^2$, optionally 500 W/m$^2$.

According to some aspects, the first and second aqueous electrolyte solutions comprise water and optionally another solvent. The solvent system in the first and second aqueous electrolyte solutions may optionally be chosen so that all materials in the first and second aqueous electrolyte solutions remain in solution during charge and discharge cycles. In some aspects, the solvent system in the first and second aqueous electrolyte solutions has a boiling point that is at least 50° C., optionally at least 70° C., or optionally at least 90° C. greater than the boiling point of the thermally regenerative ligand. Exemplary solvent systems in the first and second aqueous electrolyte solutions may be greater than 95 wt % water, optionally greater than 90 wt % water, optionally greater than 80 wt % water, optionally greater than 70 wt % water, optionally greater than 60 wt % water, optionally greater than 50 wt % water, optionally greater than 40 wt % water, optionally greater than 30 wt % water, optionally greater than 20 wt % water, or optionally greater than 10 wt % water.

In some aspects, the first and second aqueous electrolyte solutions may optionally include a supporting electrolyte. The role of the supporting electrolyte is to increase the solution conductivity and decrease the ohmic loss (internal resistance) of the thermoelectrochemical system. The supporting electrolyte remains in solution during charge and discharge of the battery. The supporting electrolyte may be chosen to maximize the soluble concentrations of metal redox pairs in the first and second aqueous electrolyte solutions. In some aspects, the supporting electrolyte is chosen to tune the electrode potentials of metal redox pairs in the first and second aqueous electrolyte solutions. The supporting electrolyte may include a thermally regenerative ligand and optionally a non-thermally regenerative ligand. In some aspects, the supporting electrolyte includes ammonium, ammonia, chloride, bromide, potassium, sodium, magnesium, sulfate, nitrate, or a combination thereof.

Ammonia may be added to the first aqueous electrolyte solution, thereby promoting a first half reaction in the first aqueous electrolyte solution and a second half reaction in the second aqueous electrolyte solution:

$$\text{first half reaction: } M(NH_3)_j^{x+}(aq) + z\,NH_3 \rightarrow M(NH_3)_{j+z}^{x+y}(aq) + ye^-$$

where x is 1 or 2, optionally x is 1; y is 1 or 2, optionally y is 1; $0 \leq j \leq 5$, optionally $1 \leq j \leq 3$, optionally j is 2; and $0 \leq z \leq 5$, optionally $1 \leq z \leq 3$, optionally z is 2, $$\text{second half reaction: } M(L)_j^{x+y}(aq) + ye^- + z\,L \rightarrow M(L)_{j+z}^x(aq)$$

where $-4 \leq x \leq 1$, optionally $-3 \leq x \leq 0$, optionally x is $-2$ or $-1$, optionally x is $-2$; y is 1 or 2, optionally y is 1; $0 \leq j \leq 5$, optionally $1 \leq j \leq 4$, optionally j is 2 or 3; and $0 \leq z \leq 5$, optionally $0 \leq z \leq 2$, optionally z is 0.

The first half reaction resulting in a spent electrolyte solution and the second half reaction resulting in a first aqueous electrolyte solution, the reactions producing an electrical current.

In some aspects, the thermoelectrochemical system according to the present disclosure may be recharged electrically. An electric current may optionally be applied that reverses the first half reaction in the spent electrolyte solution resulting in a first aqueous electrolyte solution and also reverses the second half reaction in the first aqueous electrolyte solution resulting in a second aqueous electrolyte solution.

In some aspects, the thermoelectrochemical system according to the present disclosure may be recharged thermally. The spent electrolyte solution may optionally be heated to volatilize and remove the ammonia, thereby generating a second aqueous electrolyte solution. Ammonia may be volatilized at a temperature range of 30° C.-95° C., such as a temperature range of 40° C.-80° C. Vacuum may be applied to the spent electrolyte solution while volatizing ammonia such that decreased heat is required and the volatilization occurs at lower temperatures.

The heat used to volatilize the ammonia can be waste heat from any reaction or process. Thus, processes and systems according to such embodiments allow for capture of waste heat energy through regeneration of the second aqueous electrolyte solution. Alternatively, the heat used can be drawn from conventional sources. In a further alternative, the heat can be generated by a secondary process such as from water in solar energy cells. Low-grade thermal energy (temperatures<150° C.) is available at many industrial sites and from geothermal and solar-based processes.

The volatilized ammonia is optionally captured and reused by addition to the first aqueous electrolyte solution. Optionally or in addition, fresh ammonia is added to the first aqueous electrolyte solution. Whether fresh or captured ammonia is used, the addition of ammonia to the first aqueous electrolyte solution promotes a first half reaction in the first aqueous electrolyte solution and a second half reaction in the second aqueous electrolyte solution:

$$\text{first half reaction: } M(NH_3)_j^{x+}(aq) + z\,NH_3 \rightarrow M(NH_3)_{j+z}^{x+y}(aq) + ye^-$$

where x is 1 or 2, optionally x is 1; y is 1 or 2, optionally y is 1; $0 \leq j \leq 5$, optionally $1 \leq j \leq 3$, optionally j is 2; and $0 \leq z \leq 5$, optionally $1 \leq z \leq 3$, optionally z is 2, $$\text{second half reaction: } M(L)_j^{x+y}(aq) + ye^- + z\,L \rightarrow M(L)_{j+z}^x(aq)$$

where $-4 \leq x \leq 1$, optionally $-3 \leq x \leq 0$, optionally x is $-2$ or $-1$, optionally x is $-2$; y is 1 or 2, optionally y is 1; $0 \leq j \leq 5$, optionally $1 \leq j \leq 4$, optionally j is 2 or 3; and $0 \leq z \leq 5$, optionally $0 \leq z \leq 2$, optionally z is 0.

The first half reaction results in a spent electrolyte solution and the second half reaction results in a first aqueous electrolyte solution, the reactions producing an electrical current.

The process of volatilizing ammonia from the spent electrolyte solution to generate a second aqueous electrolyte solution and then adding ammonia to the first electrolyte solution to promote reactions that produce an electrical current may be repeated one or more additional times.

According to some aspects, the first electrode compartment is in fluid communication with a first electrolyte reservoir. Optionally, the second electrode compartment is in fluid communication with a second electrolyte reservoir. The first and second electrolyte reservoirs may house additional first and second electrolyte solutions respectively. The additional electrolyte solutions may be cycled with the electrolyte solution in the respective electrode compartment to replenish the electrolyte and allow for additional capacity of the overall battery system. The volume of electrolyte solutions in the reservoirs is not particularly limited and may be freshly supplied and or be regenerated along with the electrolyte solution within the electrode compartment.

In an exemplary aspect of the thermoelectrochemical system as illustrated in FIG. 2A, a first aqueous electrolyte solution 210 comprising a copper (I) species, optionally copper (II) species, and ammonium chloride is disposed in a first electrode compartment 220. A second aqueous electrolyte solution 230 comprising a copper (II) species, optionally a copper (I) species, and ammonium chloride is disposed in a second electrode compartment 240. The first electrode compartment 220 and the second electrode compartment 240 are separated by an ion exchange membrane 250. The first electrode compartment 220 includes a first electrode 260, which optionally includes or is carbon felt. The second electrode compartment 240 includes a second electrode 270, which also includes or is carbon felt. The first electrode compartment 220 is in fluid communication with a first electrolyte reservoir 280. The second electrode compartment 240 is in fluid communication with a second electrolyte reservoir 290. Ammonia may be added to the first aqueous electrolyte solution 210 to generate electric current.

Figure 2B:
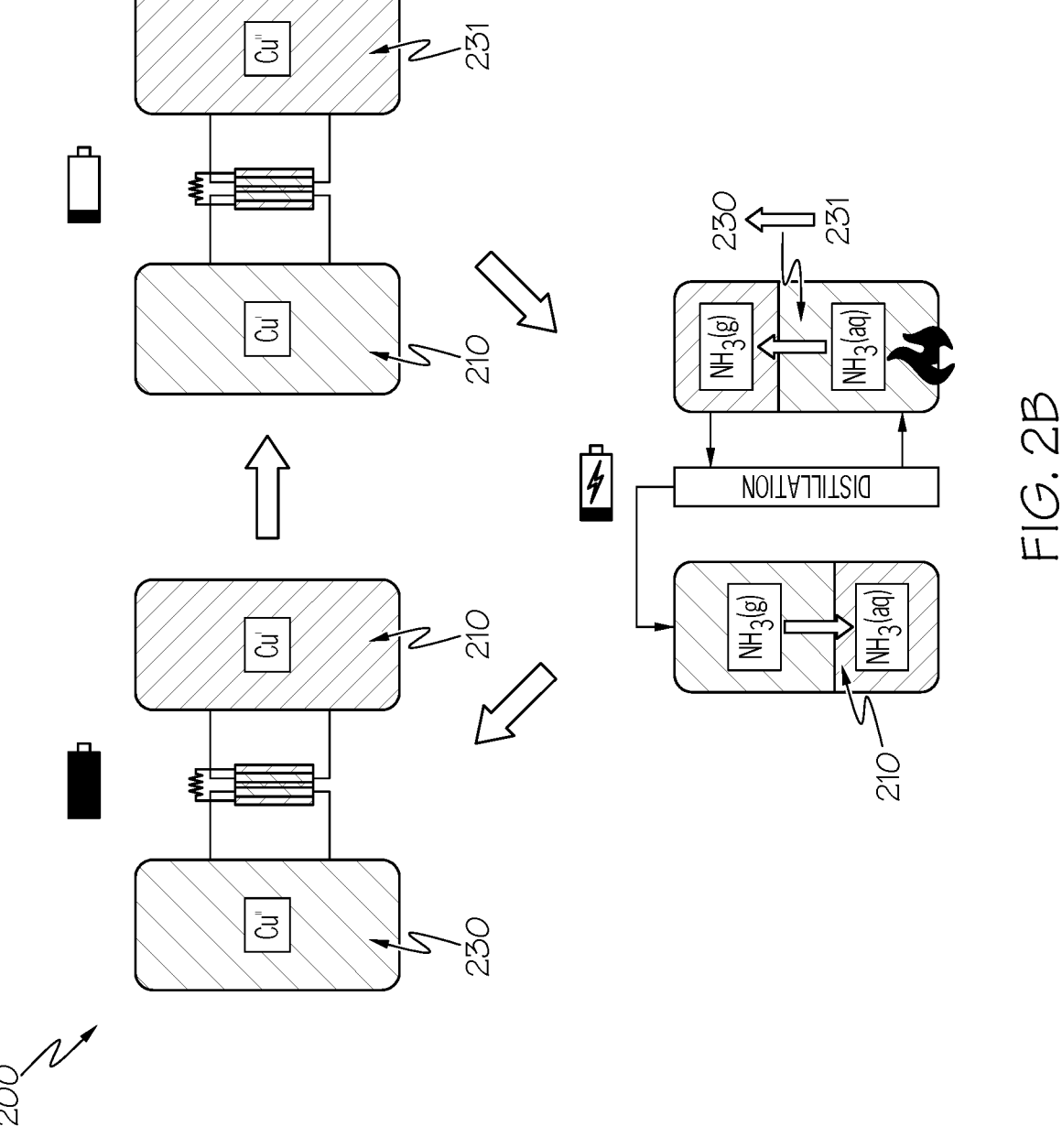
FIG. 2B depicts the thermal charge and electrochemical discharge cycle of the exemplary battery of FIG. 2A.

During discharge of the exemplary aspect of the thermochemical system according to FIG. 2A, the presence of ammonia in the first aqueous electrolyte solution 210 drives the oxidation of copper(I) to copper(II) and results in a spent electrolyte solution 231 (see FIG. 2B). The electrons flow to the second aqueous electrolyte solution 230, causing the reduction of copper(II) to copper(I), which results in a first aqueous electrolyte solution 210 (see FIG. 2B).

Referring now to FIG. 2B, the exemplary aspect of the thermochemical system according to FIG. 2A may be recharged by volatilizing ammonia from the spent electrolyte solution 231 to form a second electrolyte solution 230. The ammonia may be recaptured and added to the first electrolyte solution 210 to generate electric current. This cycle may be repeated one or more additional times.

In some embodiments, the system as provided herein includes at least two cells, each cell comprising a first electrode compartment and a second electrode compartment with a separator interposed between the first electrode compartment and the second electrode compartment. The first electrode compartment of each of the at least two cells may be in fluid communication with each other first electrode compartment and a first electrolyte reservoir and the second electrode compartment of each of the at least two cells may be in fluid communication with each other second electrode compartment and a second electrolyte reservoir.

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXAMPLES

Electrolyte solutions were prepared using ammonium chloride (99.5 wt % Alfa Aeser), ammonium bromide (99 wt % Alfa Aeser), and copper chloride dihydrate (99 wt % Alfa Aeser) salts. Ammonium hydroxide was prepared from a 28 wt % ammonia Alfa Aeser stock solution. The chemical conversion of Cu(II) complexes to Cu(I) was carried out under an argon gas blanket (99.998 wt % Praxair), following a procedure developed previously. Briefly, an electrolyte containing Cu(II) complexes with a ligand that stabilizes the formation of Cu(I) is circulated with Cu(s) (99.9 wt % Alfa Aeser metal basis) promoting the formation of Cu(I) complexes through the consumption of Cu(s) and $Cu^{2+}$(aq).

Analysis of ligand impacts on the electrochemical parameters of aqueous Cu(I, II) redox couple was conducted using a Pine Instruments rotating disc electrode (RDE) system and a multiport glass cell (#AKCELL2). The RDE test system consisted of an Ag/AgCl reference electrode (RE) with a 4 mol $kg^{-1}$ KCl(aq) reference solution, and the counter electrode (CE) was a platinum coil. The two working electrodes used were platinum (Pt) and glassy carbon (GC) Fixed-Disk RDE Tips (Pine Instruments), both having a surface area of 0.1964 cm2. Both working electrodes were polished with an alumina polishing solution (0.05 μm Buehler) on a microfiber felt and rinsed with deionized (DI) water before each test. All RDE tests were performed using $10 \times 10^{-3}$ mol $kg^{-1}$ Cu(I) species and $10 \times 10^{-3}$ mol $kg^{-1}$ Cu(II) species. Ligand concentrations were varied between 1 and 4 mol $kg^{-1}$. Additional details about the system and approach used were published previously.

Figure 3:
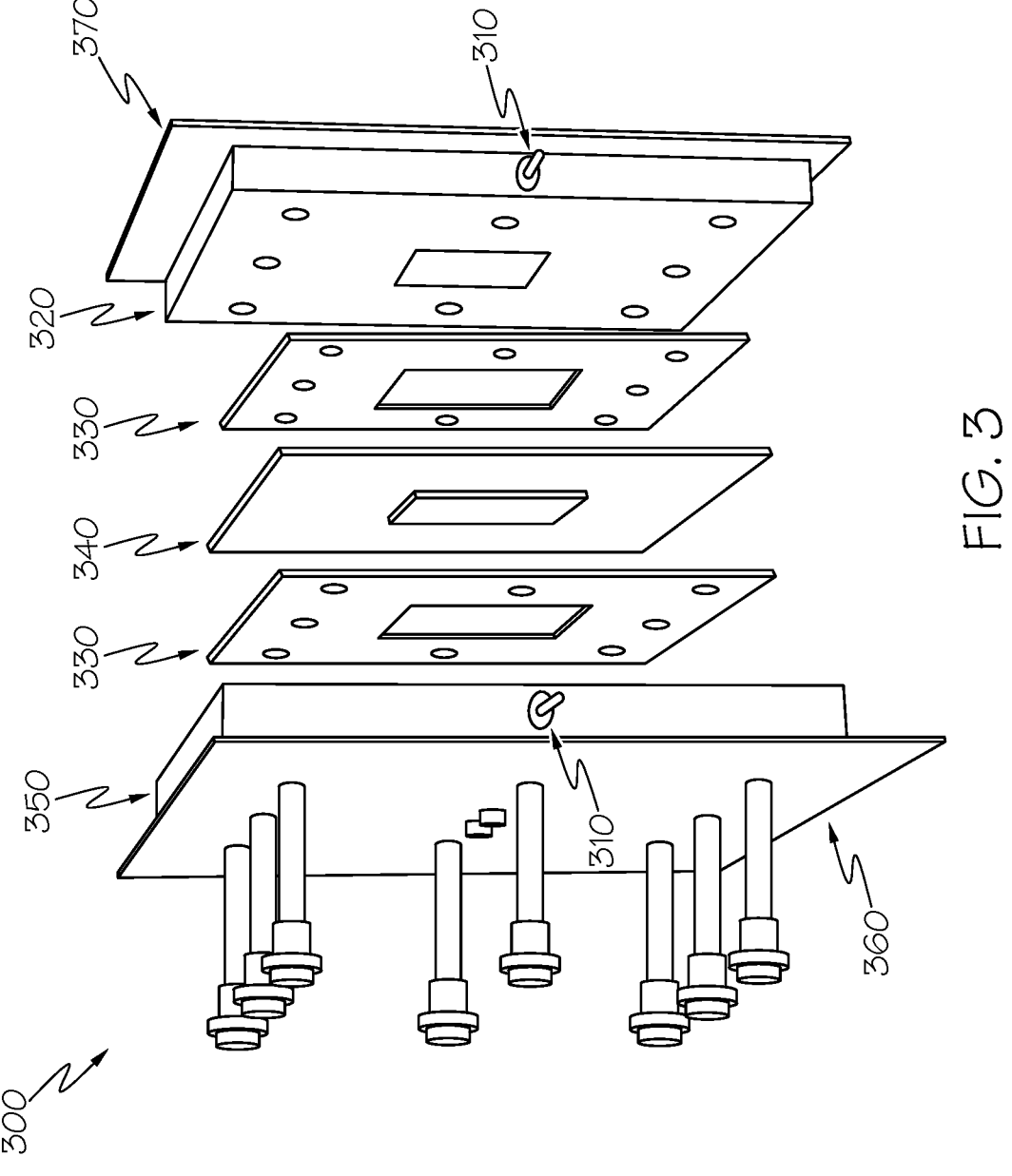
FIG. 3 depicts an exemplary redox flow battery model used for full cell testing according to some aspects as provided herein.

The full cell performance studies used a zero-gap flow battery cell having machined graphite plates with 5 cm2 serpentine flow channels. The zero-gap cell, depicted in FIG. 3, included an electrolyte inlet and outlet 310, a negative electrode current collector 320, fluorosilicone gaskets 330, an ion-conductive membrane 340 with carbon cloth electrodes, a positive electrode current collector 350, and steel end plates 360 and 370.

The pre-protonated membranes examined (Nafion® 117 and Nafion® 115) were used as received. Two Masterflex diaphragm pumps with a combination of perfluoroalkoxy (PFA) and polytetrafluoroethylene (PTFE) tubing and fittings. The electrolyte solutions were pumped at a constant flow rate (200 mL/min) into the cell through the flow channels then back into 1-liter reservoir tanks. In all full cell tests, the total concentration of the copper species in each electrolyte reservoir was 0.5 mol/kg. The ligand concentrations for tests with the Br—$NH_3$ all-aqueous thermally regenerative batteries was 5 mol/kg. The positive electrode electrolytes contained 5 mol $kg^{-1}$ $NH_4$X with 0.5 mol/kg of Cu(I, II) complexes, and the negative electrode electrolytes contained 5 mol $kg^{-1}$ $NH_4$X & $NH_3$ with 0.5 mol/kg of Cu(I, II) complexes (X=Cl or Br). The state of charge (SOC) was controlled through the mixing of Cu(I) with Cu(II) solutions.

Experimental measurements were performed with a Gamry Reference 600 for RDE tests and a Gamry Reference 3000 for full cell tests. The tests used consisted of open circuit potential (OCP), linear sweep voltammetry (LSV), and electrochemical impedance spectroscopy (EIS). RDE LSV data were collected with a scan rate of 10 mV $s^{-1}$ from potentials±0.3 V vs OCP while full cell LSV data were obtained using a scan rate of 5 mV $s^{-1}$. LSV data collected from the RDE system were corrected for the solution resistance, obtained via EIS, to examine the overpotential (η) contributions from electrode reaction processes. EIS tests used a frequency range of 0.1 Hz to 100 kHz, sampling every 5 points per decade with a 10 mV root mean square (RMS) alternating current perturbation around the OCP.

Example 1: Effect of Ligand and Ligand Concentration on Cu(I,II) Open Circuit Potentials Cu(I, II) open circuit potentials ($E_{ocp}$) were quantified through OCP measurements vs a 4 mol/kg KCl Ag/AgCl reference. Polarization curves were obtained with a platinum rotating disc electrode for solutions with different ligands as well as with 20 mmol/kg of $Cu^+$ and $Cu^{2+}$ species. The experiments were conducted at 25° C. and 1 bar at 500 RPM. The results, depicted in FIG. 4, showed a connection between E° and the ligands within their complexes.

Figure 4:
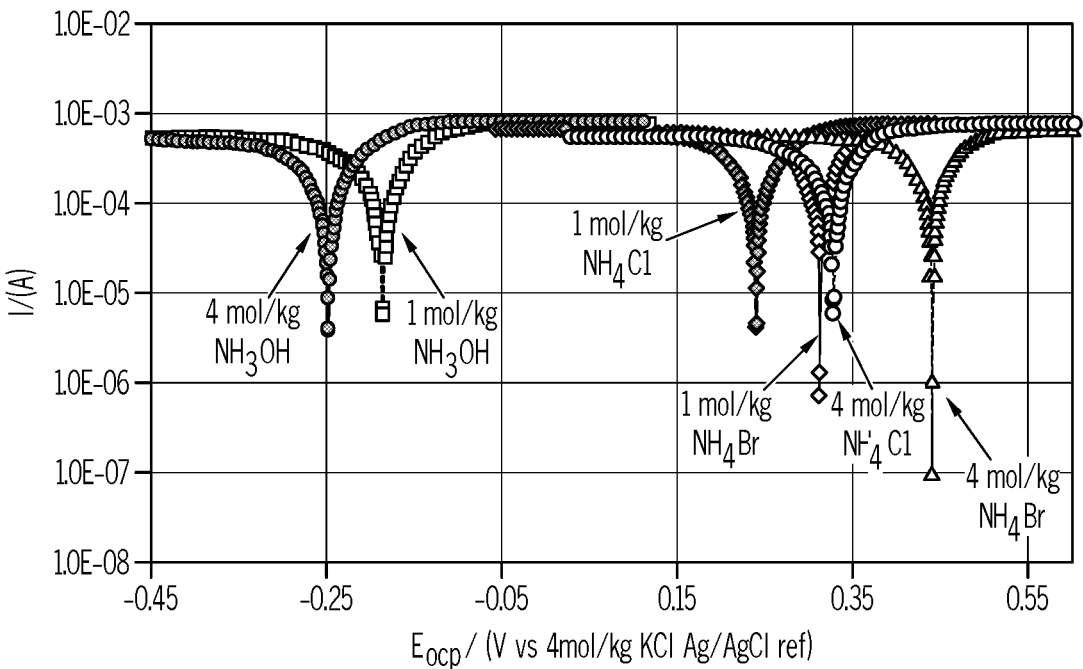
FIG. 4 depicts polarization curves obtained with a platinum rotating disc electrode for solutions with different ligands as well as with 20 mmol/kg of $Cu^+$ and $Cu^{2+}$ species.

Referring to FIG. 4, the $NH_3$(aq) solutions resulted in negative $E_{ocp}$ shifts, whereas Br (aq) solutions provided the largest positive $E_{ocp}$ shifts. Increases in ligand concentration also increased the extent of these $E_{ocp}$ shifts. Speciation analyses also showed that $Cl^-$(aq) and $Br^-$(aq) ligands preferentially bonded to Cu(I) species while $NH_3$(aq) preferred Cu(II) species. As such, the observed shifts in $E_{ocp}$ followed a similar trend as outlined in the spectrochemical series (FIG. 1).

The stronger field ligands decreased $E_{ocp}$ values and preferred complexation with $Cu^{2+}$(aq), whereas weaker field ligands increased $E_{ocp}$ and preferentially complexes with $Cu^+$(aq) species. These results show the substantial tunability of the Cu(I,II)-$NH_3$(aq) redox reaction and indicate that the reaction can be utilized for a redox flow battery with thermal regeneration capabilities.

Example 2: Power Density Curves

Power densities for all aqueous Cu(I,II)-$NH_3$ batteries were measured with different non-thermally regenerative ligands and different ion permeable membranes. All ligands were present at 5 mol/kg.

Figure 5:
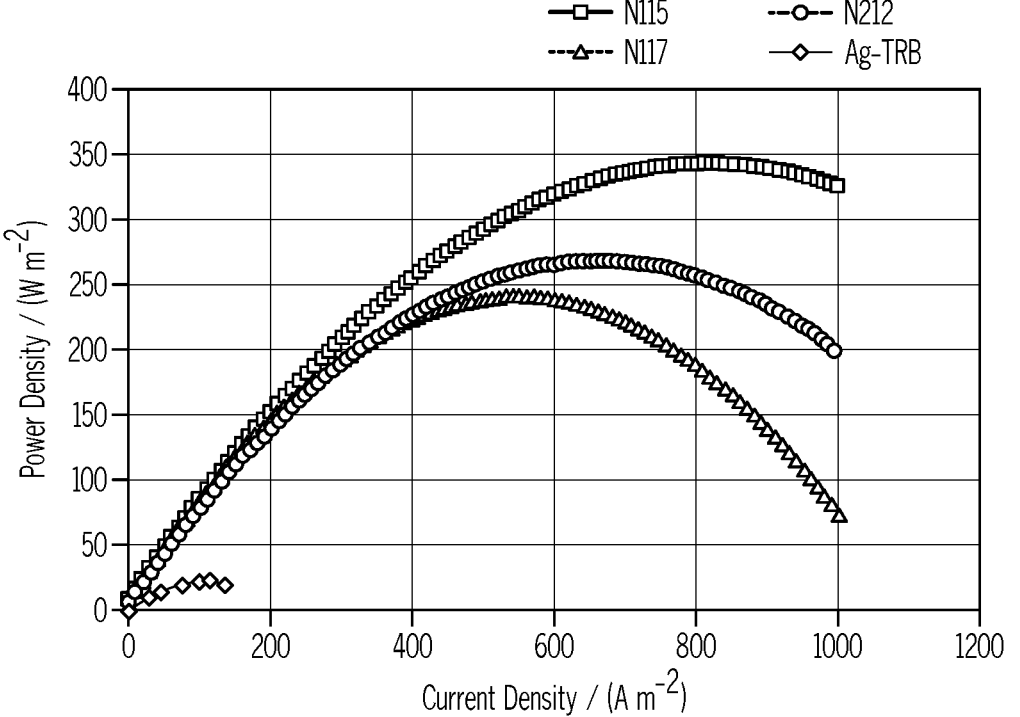
FIG. 5 depicts power densities obtained from a silver thermally regenerative battery that relies on metal deposition reactions and all-aqueous Cu(I,II) thermally regenerative batteries using $NH_4Br$ and $NH_3$ ligands with varied ion permeable membranes.
Figure 6:
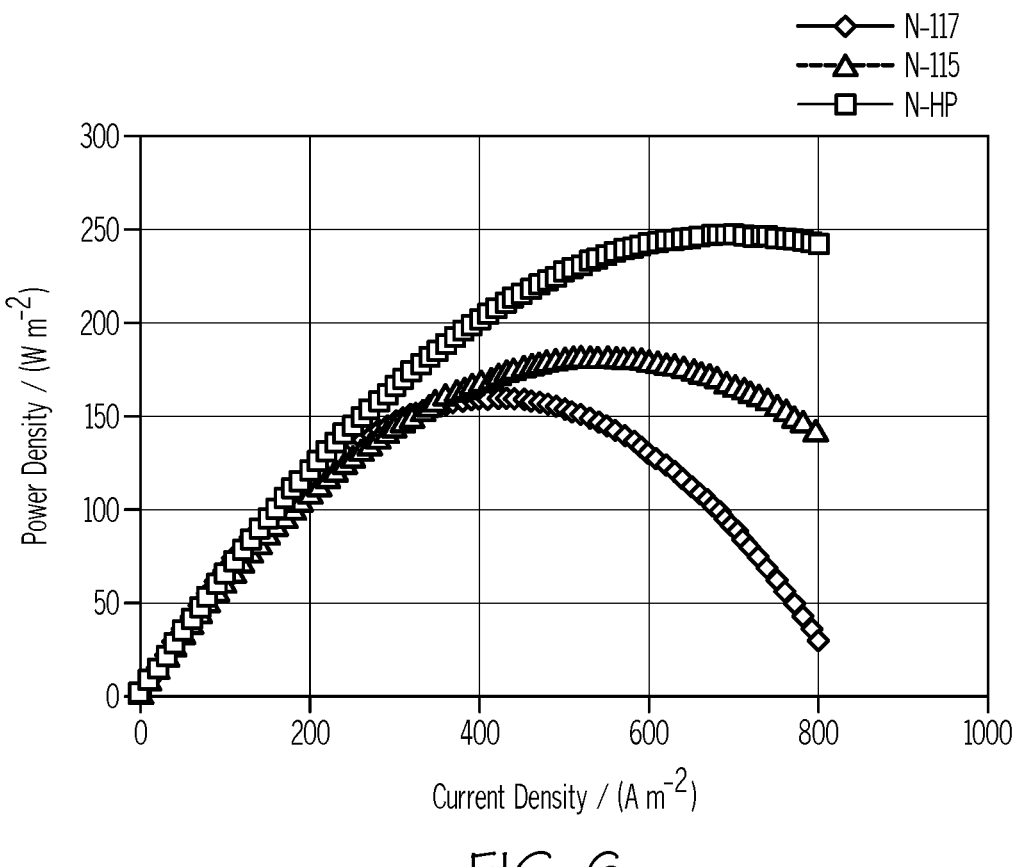
FIG. 6 depicts power densities obtained from all-aqueous Cu(I,II) thermally regenerative battery using $NH_4Cl$ and $NH_3$ ligands with varied ion permeable membranes.

Depicted in FIG. 5 are power densities obtained from a silver thermally regenerative battery that relies on metal deposition reactions and all-aqueous Cu(I,II) thermally regenerative batteries using $NH_4$Br and $NH_3$ ligands with varied ion permeable membranes. Depicted in FIG. 6 are power densities obtained from all-aqueous Cu(I,II) thermally regenerative battery using $NH_4$Cl and $NH_3$ ligands with varied ion permeable membranes. Consistent with the RDE results in example 1, the use of $Br^-$ as the non-thermally regenerative ligand provided higher maximum power densities (~240-350 W $m^{-2}$) compared with $Cl^-$ (~155-260 W $m^{-2}$). These power densities were considerably higher than thermal regenerative battery systems utilizing metal deposition reactions with copper (~60 W $m^{-2}$) or silver (~25 W $m^{-2}$).

The all aqueous thermally regenerative Cu(I,II)-NH$_3$ battery achieved power densities comparable to the 100 to 600 W m$^{-2}$ obtained from other all aqueous flow batteries, such as the vanadium and the all-soluble, all-iron redox flow batteries while also providing the option to advantageously recharge the battery with low-grade thermal energy.

ADDITIONAL EXEMPLARY ASPECTS

1. A thermoelectrochemical system comprising:
   a reactor comprising first and second electrode compartments, a separator interposed between the first and second electrode compartments,
   wherein the reactor further comprises first and second electrodes disposed in the first and second electrode compartments, respectively; and
   the first and second electrode compartments comprise first and second aqueous electrolyte solutions, respectively, wherein the first electrode compartment, the second electrode compartment, or both comprise a thermally regenerative ligand and optionally a non-thermally regenerative ligand;
   wherein the first and second aqueous electrolyte solutions exclude solid metal dissolution and deposition reactants.
2. The system of aspect 1, wherein the first and second aqueous electrolyte solutions each comprise a metal M.
3. The system of aspects 1 or 2, wherein the first and second aqueous electrolyte solutions both comprise metal complexes with the same metal M.
4. The system of any of aspects 1-3, wherein the average oxidation state of the metal M in the metal complex is lower in the first aqueous electrolyte solution than in the second aqueous electrolyte solution.
5. The system of any of aspects 2-4, wherein the metal M is selected from copper, zinc, iron, cobalt and nickel.
6. The system of any of aspects 2-5, wherein the metal M is copper.
7. The system of any of aspects 1-6, wherein the first and second aqueous electrolyte solutions exclude solid metals, solid metal salts, and/or solid metal oxides.
8. The system of any of the previous aspects, wherein the thermally regenerative ligand comprises ammonia.
9. The system of any of the previous aspects, wherein the non-thermally regenerative ligand comprises an ammonium salt, a halide or both.
10. The system of aspect 9, wherein the ammonium salt is ammonium chloride or ammonium bromide, and/or optionally wherein the halide is chloride or bromide.
11. The system of any of the previous aspects, wherein the first and second electrodes both comprise a carbon material.
12. The system of aspect 11, wherein the carbon material is a carbon felt, carbon paper or a carbon cloth.
13. The system of any of the previous aspects, wherein the separator is an ion exchange membrane.
14. The system of aspect 13, wherein the ion exchange membrane is a tetrafluoroethylene-perfluoro-3,6-dioxa-4-methyl-7-octenesulfonic acid copolymer.
15. The system of any of the previous aspects, wherein the reactor further comprises one or more seals configured to inhibit entry of oxygen into the reactor.
16. The system of any of the previous aspects, wherein the first and second aqueous electrolyte solutions both comprise copper and further comprising ammonium chloride, ammonium bromide, or other non-thermally regenerative ligand.

17. A method of use of a thermoelectrochemical system, comprising:
   providing the thermoelectrochemical system of any one of aspects 1-16 in any combination;
   adding ammonia to the first aqueous electrolyte solution, thereby promoting a first half reaction in the first aqueous electrolyte solution and a second half reaction in the second aqueous electrolyte solution wherein, the first half reaction is: $M(NH_3)_j^{x+}(aq) + z\,NH_3 \rightarrow M(NH_3)_{j+z}^{x+y}(aq) + ye^-$ where x is 1 or 2; y is 1 or 2; $0 \leq j \leq 5$; and $0 \leq z \leq 5$, second half reaction: $M(L)_j^{x+y}(aq) + ye^- + z\,L \rightarrow M(L)_{j+z}^{x}(aq)$ where $-4 \leq x \leq 1$; y is 1 or 2; $0 \leq j \leq 5$; and $0 \leq z \leq 5$, and
   wherein the first half reaction results in a spent electrolyte solution and the second half reaction results in a first aqueous electrolyte solution, the reactions producing an electrical current.
18. The method of aspect 17, further comprising heating the spent electrolyte solution to volatilize and remove the ammonia, thereby generating a second aqueous electrolyte solution; and
   adding ammonia to the first aqueous electrolyte solution, thereby promoting a first half reaction in the first aqueous electrolyte solution and a second half reaction in the second aqueous electrolyte solution, wherein the first half reaction is: $M(NH_3)_j^{x+}(aq) + z\,NH_3 \rightarrow M(NH_3)_{j+z}^{x+y}(aq) + ye^-$ where x is 1 or 2; y is 1 or 2; $0 \leq j \leq 5$; and $0 \leq z \leq 5$, second half reaction: $M(L)_j^{x+y}(aq) + ye^- + z\,L \rightarrow M(L)_{j+z}^{x}(aq)$ where $-4 \leq x \leq 1$; y is 1 or 2; $0 \leq j \leq 5$; and $0 \leq z \leq 5$, and
   wherein the first half reaction results in a spent electrolyte solution and the second half reaction results in a first aqueous electrolyte solution, the reactions producing an electrical current.
19. The method of aspect 18, further comprising repeating the adding ammonia one or more additional times.
20. The method of any of aspects 17-19, wherein the first electrode compartment is in fluid communication with a first electrolyte reservoir and the second electrode compartment is in fluid communication with a second electrolyte reservoir.
21. The method of any of claims 17-20, wherein the system comprises at least two cells, each cell comprising a first electrode compartment and a second electrode compartment; a separator interposed between the first electrode compartment and the second electrode compartment, wherein the first electrode compartment of each of the at least two cells is in fluid communication with each other first electrode compartment and a first electrolyte reservoir and wherein the second electrode compartment of each of the at least two cells is in fluid communication with each other second electrode compartment and a second electrolyte reservoir.

22. The method of any of aspects 17-21, wherein the first and second aqueous electrolyte solutions exclude solid metals, solid metal salts, and solid metal oxides.

23. The method of any of aspects 17-22, wherein the metal M is selected from copper, silver, cobalt and nickel.

24. The method of aspect 23, wherein the metal M is copper.

25. The method of any of aspects 17-24, wherein the first and second aqueous electrolyte solutions each comprise an ammonium salt.

26. The method of aspect 25, wherein the ammonium salt is ammonium chloride or ammonium bromide.

27. The method of any of aspects 17-26, wherein the first and second electrodes both comprise a carbon material.

28. The method of aspect 27, wherein the carbon material is a carbon felt or a carbon cloth.

29. The method of any of aspects 17-28, wherein the separator is an ion exchange membrane.

30. The method of aspect 29, wherein the ion exchange membrane is a tetrafluoroethylene-perfluoro-3,6-dioxa-4-methyl-7-octenesulfonic acid copolymer.

31. The method of any of aspects 17-30, wherein the system further comprises one or more seals to inhibit entry of oxygen into the reactor.

32. The method of any of aspects 17-31, further comprising sparging the first and second aqueous electrolyte solutions with a non-oxygen containing gas to remove oxygen and inhibit corrosion of electrodes in the reactor.

33. The method of any of aspects 17-32, wherein the first and second aqueous electrolyte solutions both comprise copper and ammonium chloride.

Various modifications of the present disclosure, in addition to those shown and described herein, will be apparent to those skilled in the art of the above description. Such modifications are also intended to fall within the scope of the appended claims.

It is appreciated that all reagents are obtainable by sources known in the art unless otherwise specified.

REFERENCE LIST

F. Zhang, J. Liu, W. Yang, and B. Logan, "AMMONIA-BASED THERMOELECTROCHEMICAL SYSTEMS AND METHODS," U.S. Pat. No. 10,431,842 B2, 2019.

M. Rahimi et al., "Emerging electrochemical and membrane-based systems to convert low-grade heat to electricity," Energy Environ. Sci., vol. 11, no. 2, pp. 276-285, 2018, doi: 10.1039/c7ee03026f.

M. Skyllas-Kazacos, L. Cao, M. Kazacos, N. Kausar, and A. Mousa, "Vanadium Electrolyte Studies for the Vanadium Redox Battery-A Review," ChemSusChem, vol. 9, no. 13, pp. 1521-1543, 2016, doi: 10.1002/cssc.201600102.

P. Peljo, D. Lloyd, N. Doan, M. Majaneva, and K. Kontturi, "Towards a thermally regenerative all-copper redox flow battery," Phys. Chem. Chem. Phys., vol. 16, pp. 2831-2835, 2014, doi: 10.1039/c3cp54585g.

L. Sanz, D. Lloyd, E. Magdalena, J. Palma, and K. Kontturi, "Description and performance of a novel aqueous all-copper redox flow battery," J. Power Sources, vol. 268, pp. 121-128, 2014, doi: 10.1016/j.jpowsour.2014.06.008.

E. A. Stricker, K. W. Krueger, R. F. Savinell, and J. S. Wainright, "Investigating a Bromide Supported Electrolyte for an All-Copper Flow Battery," J. Electrochem. Soc., vol. 165, no. 9, pp. A1797-A1804, 2018, doi: 10.1149/2.1031809jes.

L. Wei, M. C. Wu, T. S. Zhao, Y. K. Zeng, and Y. X. Ren, "An aqueous alkaline battery consisting of inexpensive all-iron redox chemistries for large-scale energy storage," Appl. Energy, vol. 215, no. July 2017, pp. 98-105, 2018, doi: 10.1016/j.apenergy.2018.01.080.

K. L. Hawthorne, J. S. Wainright, and R. F. Savinell, "Studies of Iron-Ligand Complexes for an All-Iron Flow Battery Application," J. Electrochem. Soc., vol. 161, no. 10, pp. A1662-A1671, 2014, doi: 10.1149/2.0761410jes.

K. Gong et al., "All-Soluble All-Iron Aqueous Redox-Flow Battery," ACS Energy Lett., vol. 1, no. 1, pp. 89-93, 2016, doi: 10.1021/acsenergylett.6b00049.

A. Khor et al., "Review of zinc-based hybrid flow batteries: From fundamentals to applications," Mater. Today Energy, vol. 8, pp. 80-108, 2018.

X. B. Cheng, R. Zhang, C. Z. Zhao, and Q. Zhang, "Toward Safe Lithium Metal Anode in Rechargeable Batteries: A Review," Chem. Rev., vol. 117, no. 15, pp. 10403-10473, 2017, doi: 10.1021/acs.chemrev.7b00115.

B. Dunn, H. Kamath, and J. Tarascon, "Electrical Energy Storage for the Grid: A Battery of Choices," Science (80-.)., vol. 334, no. 18, pp. 928-935, 2011.

W. Wang, Q. Luo, B. Li, X. Wei, L. Li, and Z. Yang, "Recent progress in redox flow battery research and development," Adv. Funct. Mater., vol. 23, no. 8, pp. 970-986, 2013, doi: 10.1002/adfm.201200694.

D. M. Hall, N. N. Akinfiev, E. G. LaRow, R. S. Schatz, and S. N. Lvov, "Thermodynamics and Efficiency of a CuCl(aq)/HCl(aq) Electrolyzer," Electrochim. Acta, vol. 143, pp. 70-82, October 2014, doi: 10.1016/j.electacta.2014.08.018.

M. Rahimi, T. Kim, C. A. Gorski, and B. E. Logan, "A thermally regenerative ammonia battery with carbon-silver electrodes for converting low-grade waste heat to electricity," J. Power Sources, vol. 373, no. October 2017, pp. 95-102, 2018, doi: 10.1016/j.jpowsour.2017.10.089. Obrovac, M., et al., J. Electrochem. Soc. 2007, 154, 9, A849-A855.

The forgoing description of particular aspect(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the systems or methods are described as an order of individual steps or using specific materials, it is appreciated that steps or materials may be interchangeable such that the description of the invention may include multiple systems or steps arranged in many ways as is readily appreciated by one of skill in the art.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular aspects, but is not meant to be a limitation upon the practice thereof.

The invention claimed is:

1. A thermoelectrochemical system comprising:
a reactor comprising first and second electrode compartments, a separator interposed between the first and second electrode compartments,
wherein the reactor further comprises first and second electrodes disposed in the first and second electrode compartments, respectively; and
the first and second electrode compartments comprise first and second aqueous electrolyte solutions, respectively, wherein the first electrode compartment, the second electrode compartment, or both comprise a thermally regenerative ligand;
wherein the first and second aqueous electrolyte solutions exclude solid metal dissolution and deposition reactants.

2. The system of claim 1, wherein the first and second aqueous electrolyte solutions each comprise a metal M, or metal complexes with the same metal M.

3. The system of claim 1, wherein the first electrode compartment, the second electrode compartment, or both comprise a non-thermally regenerative ligand.

4. The system of claim 2, wherein the average oxidation state of the metal M in the metal complex is lower in the first aqueous electrolyte solution than in the second aqueous electrolyte solution.

5. The system of claim 2, wherein the metal M is selected from the group consisting of copper, zinc, iron, cobalt and nickel.

6. The system of claim 1, wherein the first and second aqueous electrolyte solutions exclude solid metals, solid metal salts, and solid metal oxides.

7. The system of claim 1 comprising a non-thermally regenerative ligand, wherein the thermally regenerative ligand comprises ammonia.

8. The system of claim 1, wherein the non-thermally regenerative ligand comprises an ammonium salt, a halide or both.

9. The system of claim 8, wherein the ammonium salt is ammonium chloride or ammonium bromide.

10. The system of claim 1, wherein the first and second electrodes both comprise a carbon material.

11. The system of claim 10, wherein the carbon material is a carbon felt, carbon paper or a carbon cloth.

12. The system of claim 1, wherein the separator is an ion exchange membrane.

13. The system of claim 1, wherein the first and second aqueous electrolyte solutions both comprise copper and: ammonium chloride; ammonium bromide; or other non-thermally regenerative ligand.

14. A method of use of a thermoelectrochemical system, comprising:
providing the thermoelectrochemical system of claim 1;
adding ammonia to the first aqueous electrolyte solution, thereby promoting a first half reaction in the first aqueous electrolyte solution and a second half reaction in the second aqueous electrolyte solution, wherein the first half reaction is: $M(\mathrm{NH}_3)_j^{x+}(aq) + z\,\mathrm{NH}_3 \rightarrow M(\mathrm{NH}_3)_{j+z}^{x+y}(aq) + ye^-$ where x is 1 or 2; y is 1 or 2; $0 \leq j \leq 5$; and $0 \leq z \leq 5$, second half reaction: $M(L)_j^{x+y}(aq) + ye^- + z\,L \rightarrow M(L)_{j+z}^x(aq)$ where $-4 \leq x \leq 1$; y is 1 or 2; $0 \leq j \leq 5$; and $0 \leq z \leq 5$, and wherein M in each instance is independently a metal, L is a non-thermally regenerative ligand, and wherein the first half reaction results in a spent electrolyte solution and the second half reaction results in the first aqueous electrolyte solution, the reactions producing an electrical current.

15. The method of claim 14, further comprising heating the spent electrolyte solution to volatilize and remove the ammonia, thereby generating the second aqueous electrolyte solution; and
adding ammonia to the first aqueous electrolyte solution, thereby promoting a first half reaction in the first aqueous electrolyte solution and a second half reaction in the second aqueous electrolyte solution, wherein the first half reaction is: $M(\mathrm{NH}_3)_j^{x+}(aq) + z\,\mathrm{NH}_3 \rightarrow M(\mathrm{NH}_3)_{j+z}^{x+y}(aq) + ye^-$ where x is 1 or 2; y is 1 or 2; $0 \leq j \leq 5$; and $0 \leq z \leq 5$, second half reaction: $M(L)_j^{x+y}(aq) + ye^- + zL \rightarrow M(L)_{j+z}^x(aq)$ where $-4 \leq x \leq 1$; y is 1 or 2; $0 \leq j \leq 5$; and $0 \leq z \leq 5$, and wherein M in each instance is independently a metal, L is a non-thermally regenerative ligand, and wherein the first half reaction results in a spent electrolyte solution and the second half reaction results in a first aqueous electrolyte solution, the reactions producing an electrical current.

16. The method of claim 14, wherein the first electrode compartment is in fluid communication with a first electrolyte reservoir and the second electrode compartment is in fluid communication with a second electrolyte reservoir.

17. The method of claim 14, wherein the system comprises at least two cells, each cell comprising a first electrode compartment and a second electrode compartment; a separator interposed between the first electrode compartment and the second electrode compartment, wherein the first electrode compartment of each of the at least two cells is in fluid communication with each other first electrode compartment and a first electrolyte reservoir and wherein the second electrode compartment of each of the at least two cells is in fluid communication with each other second electrode compartment and a second electrolyte reservoir.

18. The method of claim 14, wherein the first and second aqueous electrolyte solutions exclude solid metals, solid metal salts, and solid metal oxides.

19. The method of claim 14, wherein the metal M is selected from copper, silver, cobalt, nickel, or any combination thereof.

20. The method of claim 19, wherein the metal M is copper.

21. The method of claim 14, wherein the first and second aqueous electrolyte solutions each comprise an ammonium salt.

22. The method of claim 21, wherein the ammonium salt is ammonium chloride or ammonium bromide.

23. The method of claim 14, wherein the first and second electrodes both comprise a carbon material.

24. The method of claim 23, wherein the carbon material is a carbon felt or a carbon cloth.

25. The method of claim 14, wherein the separator is an ion exchange membrane.

26. The method of claim 25, wherein the ion exchange membrane is a tetrafluoroethylene-perfluoro-3,6-dioxa-4-methyl-7-octenesulfonic acid copolymer.

27. The method of claim 14, wherein the system further comprises one or more seals to inhibit entry of oxygen into the reactor.

28. The method of claim 14, further comprising sparging the first and second aqueous electrolyte solutions with a non-oxygen containing gas to remove oxygen and inhibit corrosion of electrodes in the reactor.

29. The method of claim 14, wherein the first and second aqueous electrolyte solutions both comprise copper and ammonium chloride.

* * * * *